J. PALMER.
Die for Making Heads for Elliptic Springs.
No. 3,046. Reissued July 21, 1868.
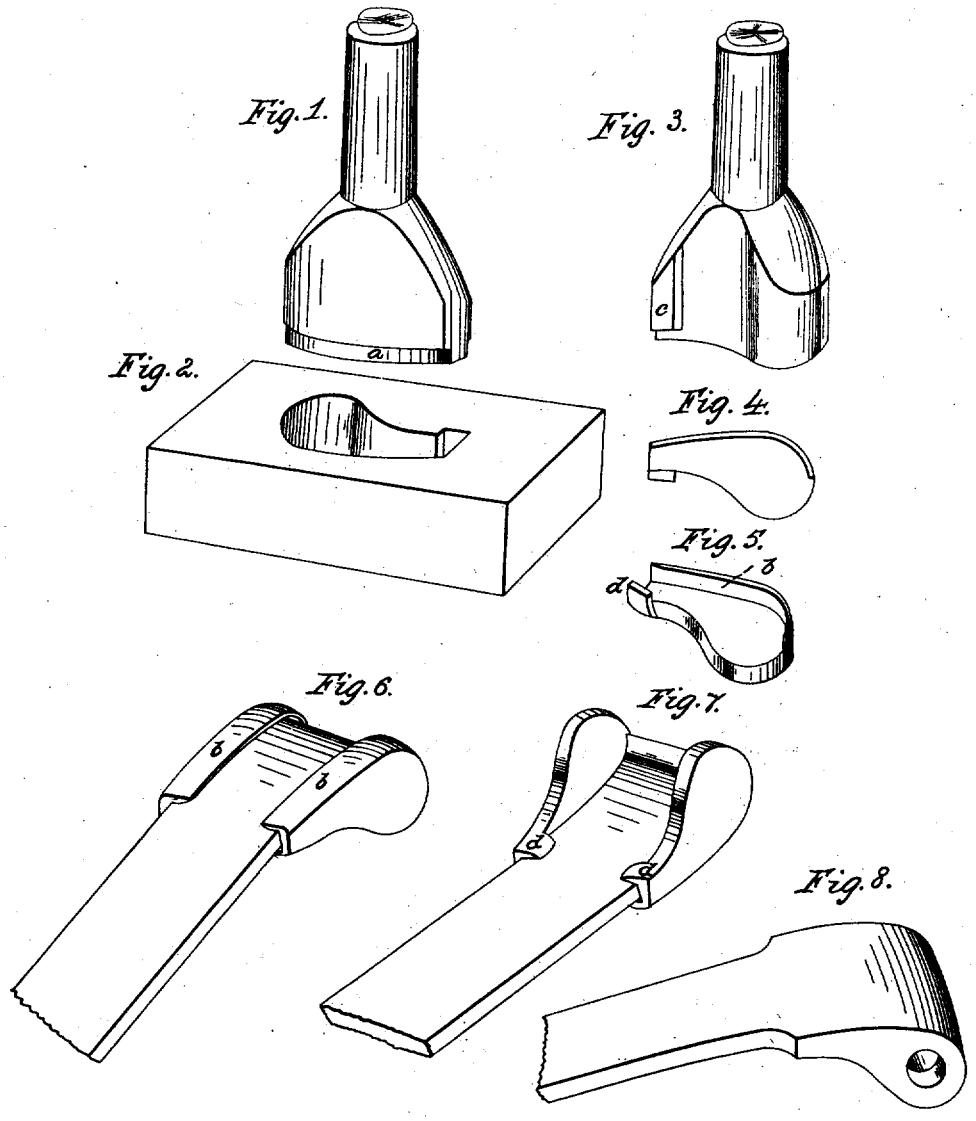
Witnesses:
Anson S. Marshall
John Burgum
Inventor:
Joseph Palmer
N. PETERS, Photo-Lithographer, Washington, D. C.

United States Patent Office.

JOSEPH PALMER, OF CONCORD, NEW HAMPSHIRE.

*Letters Patent No.* 68,454, *dated September* 3, 1867; *reissue No.* 3,046, *dated July* 21, 1868.

IMPROVEMENT IN THE MODE OF MANUFACTURING HEADS FOR ELLIPTIC SPRINGS.

The Schedule referred to in these Letters Patent and making part of the same.

TO ALL WHOM IT MAY CONCERN:

Be it known that I, JOSEPH PALMER, of Concord, in the county of Merrimack, and State of New Hampshire, have invented a new and improved Method of Manufacturing Heads for Elliptic Springs; and I do hereby declare that the following is a full and exact description thereof, reference being had to the accompanying drawings, and the letters of reference marked thereon.

The nature of my invention consists in constructing right and left dies for punching out ears of any required form or size, to be fixed on the ends of the main leaf of elliptic springs preparatory to welding, which greatly facilitates the making of heads to the same.

For the purpose of enabling others skilled in the art to make and use my invention, I will proceed more fully to describe the same.

In the drawings annexed hereto—

Figure 1 is a perspective view of the top die or punch, showing a portion of the face cut away at *a*, for the purpose of forming the scarf or lip *b*, fig. 5, which overlaps the steel, as shown at *b b*, fig. 6.

Figure 2 is a top view of the lower die.

Figure 3 is also a perspective view of a top die or punch, showing the projection at *c*, for the purpose of forming the lip *d*, fig. 5. This die or punch, with its corresponding lower die, forms the opposite ear to that formed by the punch and die shown at figs. 1 and 2.

Figure 4 is a plan or top view of the ear formed by the matrix of the lower die of fig. 3.

Figure 5 is a perspective view of an ear formed by fig. 3 and its lower die.

Figure 6 is a perspective view of the end of an elliptic spring, with the ears fixed ready for welding.

Figure 7 is the under side of fig. 6, showing the manner in which the ears are held by the lips *d d* for and during the process of welding.

Figure 8 is the finished French head of an elliptic spring, made as above described.

The particular form of the dies shown in the drawings is for making that form of an ear which, when welded to the end of the main leaf of an elliptic spring, makes what is termed a French head, but I do not limit myself to this form of a die, but include dies for making the round or English heads, or any other form that can be punched out on this principle, with lips to secure them to the main leaf in process of welding.

In the process of manufacture of my spring-head, I first strike the right and left ears by means of the dies and puncher above described. I then adjust them upon the ends of the main leaf, as shown at fig. 6 and fig. 7, and a slight blow of the hammer upon the lips *d d*, fig. 7, secures the ears in place so that they will not drop off when placed in the furnace for heating preparatory for welding. When heated to the proper point for welding, the ears are firmly welded upon said main leaf and finished, as shown at fig. 8.

I claim as my invention, and desire to secure by Letters Patent—

1. The right and left dies, constructed substantially as and for the purpose herein described.
2. As an article of manufacture the ears, as by them manufactured.
3. The application of the ears to the main leaf of elliptic springs, substantially as and for the purpose herein described.

JOSEPH PALMER.

Witnesses:

CHAS. C. LUND,

JOHN BURGUM.